(12) United States Patent
Lee et al.

(10) Patent No.: US 11,746,897 B2
(45) Date of Patent: Sep. 5, 2023

(54) ELECTRONIC SHIFT CONTROL APPARATUS

(71) Applicants: Hyundai Motor Company, Seoul (KR); Kia Corporation, Seoul (KR); SL Corporation, Daegu (KR)

(72) Inventors: Sung Hoon Lee, Seoul (KR); Han Gil Park, Gyeonggi-do (KR); Ki Young Song, Gyeonggi-do (KR); Sang Jin Meun, Gyeongsangbuk-do (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 17/530,105

(22) Filed: Nov. 18, 2021

(65) Prior Publication Data

US 2022/0333685 A1 Oct. 20, 2022

(30) Foreign Application Priority Data

Apr. 15, 2021 (KR) ........................ 10-2021-0048915

(51) Int. Cl.
*F16H 59/12* (2006.01)
*F16H 61/24* (2006.01)
*F16H 61/00* (2006.01)
*F16H 59/08* (2006.01)

(52) U.S. Cl.
CPC ............ *F16H 61/24* (2013.01); *F16H 59/12* (2013.01); *F16H 61/0006* (2013.01); *F16H 2059/081* (2013.01); *F16H 2061/241* (2013.01)

(58) Field of Classification Search
CPC .... F16H 61/24; F16H 2061/241; F16H 59/12; F16H 61/0006; A63F 13/285; G05G 1/10; G05G 5/03
See application file for complete search history.

(56) References Cited

U.S. PATENT DOCUMENTS

| | | | |
|---|---|---|---|
| 6,874,382 B2 * | 4/2005 | Danielsson ........... | F16H 59/044 74/335 |
| 8,170,757 B2 * | 5/2012 | Furhoff ................... | F16H 59/08 74/473.12 |
| 8,607,657 B2 * | 12/2013 | Haevescher ............ | F16H 59/02 74/473.12 |
| 10,018,649 B2 * | 7/2018 | Tachimoto .............. | G01P 15/09 |
| 10,288,172 B2 * | 5/2019 | Kim ........................ | F16H 61/08 |
| 10,528,137 B2 * | 1/2020 | Vanhelle ................. | G05G 5/03 |
| 10,801,610 B2 * | 10/2020 | Cha ......................... | F16H 59/08 |
| 10,969,008 B2 * | 4/2021 | Beattie .................... | F16H 59/08 |

(Continued)

FOREIGN PATENT DOCUMENTS

| | | |
|---|---|---|
| CN | 102476587 B | 4/2016 |
| JP | 2015186278 A | 10/2015 |

(Continued)

*Primary Examiner* — Gregory Robert Weber
(74) *Attorney, Agent, or Firm* — Fox Rothschild LLP (57) ABSTRACT

An electronic shift control apparatus includes a shift dial that is operated by a driver to select an R-range, an N-range, and a D-range, a P-range motor that is operated to select a P-range, and a haptic motor that generates a haptic signal. When a driver shifts into a specific shift range of a vehicle by operating the shift dial or the P-range button, the haptic signal is configured to be transmitted to the driver.

14 Claims, 9 Drawing Sheets

(56) References Cited

U.S. PATENT DOCUMENTS

2002/0020236 A1\* 2/2002 Onodera .............. F16H 59/105
                                                        74/335
2019/0334426 A1\* 10/2019 Culbertson ............ G06F 3/016
2020/0150766 A1    5/2020 Bagley et al.
2020/0271218 A1\* 8/2020 Kreinest ................ F16H 61/24
2020/0284339 A1\* 9/2020 Kim ....................... F16H 61/24
2020/0371635 A1\* 11/2020 Burgess ............... G06F 3/0416

FOREIGN PATENT DOCUMENTS

| KR | 100604441 B1   |   | 7/2006  |
|----|----------------|---|---------|
| KR | 100939792 B1   |   | 1/2010  |
| KR | 20120075003 A  |   | 7/2012  |
| KR | 20170080305 A  | \* | 7/2017  |
| KR | 101959796 B1   |   | 3/2019  |
| KR | 20190134927 A  |   | 12/2019 |

\* cited by examiner

ELECTRONIC SHIFT CONTROL APPARATUS

CROSS REFERENCE TO RELATED APPLICATION

The present application claims under 35 U.S.C. § 119(a) the benefit of Korean Patent Application No. 10-2021-0048915, filed Apr. 15, 2021, the entire contents of which are incorporated by reference herein.

BACKGROUND

(a) Technical Field

The present disclosure relates to an electronic shift control apparatus, more particularly, to the electronic shift control apparatus configured to prevent mis-operation by transmitting a haptic signal to a driver when the driver shifts into a specific shift range, which can minimize unnecessary transmission of vibration and noise from a haptic motor to other parts by applying an air gap around the haptic motor, and which can prevent damage to the haptic motor when the haptic motor is operated, using the air gap.

(b) Description of the Related Art

In general, in a vehicle equipped with an automatic transmission, gears of desired shift stages are automatically operated by controlling hydraulic pressure within a shift range set for the speed of the vehicle.

An automatic transmission generates gear ratios using a hydraulic circuit, a planetary gear set, and friction members to shift, and these components are controlled by a Transmission Control Unit (TCU).

A Shift-By-Wire (SBW) system, which is an electronic shift system for a vehicle, has no mechanical connection structure such as a cable between a transmission and a shift lever, unlike existing mechanical shift systems. In the SBW system, when a sensor value generated by operation of an electronic shift control apparatus (a shift lever or a shift button) is transmitted to the TCU, a solenoid or an electric motor is operated by an electronic signal from the TCU, and hydraulic pressure is selectively applied to the hydraulic circuit for each gear stage, thereby electronically controlling shifting.

Accordingly, an automatic transmission based on an SBW system has an advantage that shifting into a D (driving)-state, an R (rear)-stage, and an N-stage (Nd-stage or Nr-stage) is easily achieved by transmitting the intention to shift of a driver to a TCU using an electrical signal by simply operating an electronic shift control apparatus (a shift lever, button, or dial), and has another advantage that since the shift control apparatus can be formed in a small size, a wide area can be secured between the driver seat and the passenger seat.

As a method of shifting using an electronic shift system, in general, there is a lever type using a lever, a button type using a button, and a dial type using a dial.

The description provided above as a related art of the present disclosure is just for helping understanding the background of the present disclosure and should not be construed as being included in the related art known by those skilled in the art.

SUMMARY

The present disclosure relates to an electronic shift control apparatus having a shift dial that is operated by a driver to select an R-range, an N-range (Nd-range and Nr-range), and a D-range, and a P-range button that is operated to select a P (parking)-range, and an objective of the present disclosure is to provide an electronic shift control apparatus that can prevent mis-operation and improve safety by transmitting a haptic signal to a driver when the driver shifts into a specific shift range, particularly, that can minimize unnecessary transmission of vibration and noise from a haptic motor that generates a haptic signal to other parts by applying an air gap around the haptic motor, and that can prevent damage to the haptic motor when the haptic motor is operated, using the air gap.

In order to achieve the objectives of the present disclosure, an electronic shift control apparatus includes: a fixing bracket fixed to a main housing; a rotator installed to be rotatable with respect the main housing; a shift dial coupled to the rotator, the shift dial configured to rotate with the rotator by a driver so as to select any one of shift ranges of a vehicle when rotating; a main printed circuit board (PCB) fixed to the main housing and outputting a shift range signal selected by the shift dial to a transmission control unit (TCU); and a haptic motor fixed to the fixing bracket, the haptic motor being controlled to operate by the main PCB so as to generate a haptic signal when operating.

The shift range of the vehicle that is selected when the shift range is operated may be any one of an R-range, an N-range, or a D-range.

The electronic shift control apparatus may further include: a sensing gear rotatably coupled to the main housing and engaged with the rotator in an external gear type; and a magnet combined with the sensing gear, in which the PCB may output a shift range signal of any one of the R-range, the N-range, or the D-range based on a change of magnetic flux due to a position change of the magnet when the shift dial is rotated.

The haptic motor may be inserted and installed in an installation groove formed at the fixing bracket, a bottom of the haptic motor may be coupled to a bottom of the installation groove through an adhesive member, and front, rear, left, and right surfaces of the haptic motor may be spaced apart from the installation groove such that an air gap exists between the haptic motor and the installation groove.

The installation groove may be open upward, and a mouth of the installation groove may have an inclined surface such that a cross-sectional area thereof gradually increases upward.

The electronic shift control apparatus may further include a pad member coupled to a top of the haptic motor and absorbing vibration and noise that are generated when the haptic motor is operated.

The electronic shift control apparatus may further include a pad member coupled to the top and the bottom of the haptic motor and absorbing vibration and noise that are generated when the haptic motor is operated.

The electronic shift control apparatus may further include: a support PCB coupled to hook protrusions protruding upward further than the fixing bracket, fixing the position of the haptic motor in an up-down direction by pressing a top of the pad member, and connected to the main PCB through a wiring; and a P-range button disposed to be movable up and down at the center of the shift dial and configured to be pressed by a driver, in which the support PCB may generate and transmit a P-range signal to the main PCB when contact with the P-range button occurs.

Vibration and noise that are generated when the haptic motor is operated may be absorbed by the pad member and may not be transmitted to the support PCB.

The main PCB may operate the haptic motor only when a shift signal selected when the shift dial or the P-range button is operated and an actual shift signal of a transmission that is fed back through the TCU coincide with each other.

The haptic motor may be controlled to operate and generate a haptic signal by the main PCB when the shift dial is operated and the R-range is selected.

A haptic signal generated by the haptic motor may be transmitted to a driver's hand operating the shift dial through the main housing, the fixing bracket, the rotator, and the shift dial.

The haptic motor may be controlled to operate and generate a haptic signal by the main PCB when the P-range button is operated and a P-range is selected.

The electronic shift control apparatus may further include a dial guide, a dial bezel, a dial glass, and a dial liner that are combined to connect the fixing bracket and the P-range button to each other, in which a haptic signal generated by the haptic motor may be transmitted to a driver's hand operating the P-range button through the fixing bracket, the dial guide, the dial bezel, the dial glass, the dial liner, and the P-range button.

The haptic motor may be applied to other electronic shift control apparatuses of a lever type that enable shifting by operating a shift lever, a button type that enable shifting by operating a shift button, a column type in which a shift lever is disposed on a steering column, and a toggle type enabling shifting by operating a toggle switch.

The rotator may be rotated by a bearing disposed between the main housing and the rotator or between the fixing bracket and the rotator.

The electronic shift control apparatus according to the present disclosure includes the shift dial that is operated by a driver to select an R-range, an N-range (Nd-range and Nr-range), and a D-range, the P-range button that is operated to select a P-range, and the haptic motor that generates a haptic signal. Accordingly, when a driver shifts into a specific shift range (R-range or P-range) of a vehicle by operating the shift dial or the P-range button, the haptic motor is operated and a haptic signal (tactual signal) is configured to be transmitted to the driver, whereby it is possible to prevent mis-operation by the driver when shifting. Therefore, there is an effect that safety can be improved.

Further, since the air gap is formed around the haptic motor that generates a haptic signal in the present disclosure, unnecessary transmission of vibration and noise generated by the haptic motor to other parts can be minimized, whereby it is possible to improve durability of the parts.

Further, since the fixing bracket and the haptic motor can be spaced apart from each other by the air gap in the present disclosure, there is an effect that damage to the haptic motor due to the fixing bracket when the haptic motor is operated can be prevented.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present disclosure are used only in order to describe specific exemplary embodiments rather than limiting the present disclosure. Singular forms are intended to include plural forms unless the context clearly indicates otherwise.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary embodiments of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

An electronic shift control apparatus according to exemplary embodiments of the present disclosure is described hereafter in detail with reference to the accompanying drawings.

An electronic shift control apparatus according to the present disclosure, as shown in FIGS. 1 to 9, includes: a main housing fixed in the interior of a vehicle; a fixing bracket 20 fixed to the main housing 10; a rotator 40 installed to be rotatable with respect the main housing 10; a shift dial 50 coupled to the rotator 40, the shift dial 50 configured to rotate with the rotator 40 by a driver so as to select any one of shift ranges of the vehicle when rotating; a main Printed Circuit Board (PBC) 70 fixed to the main housing 10 and outputting a shift range signal selected by the shift dial 50 to a Transmission Control Unit (TCU) 60; and a haptic motor 80 fixed to the fixing bracket 20, the haptic motor 80 controlled to operate by the main PCB 70 so as to generate a haptic signal when operating.

Figure 1:
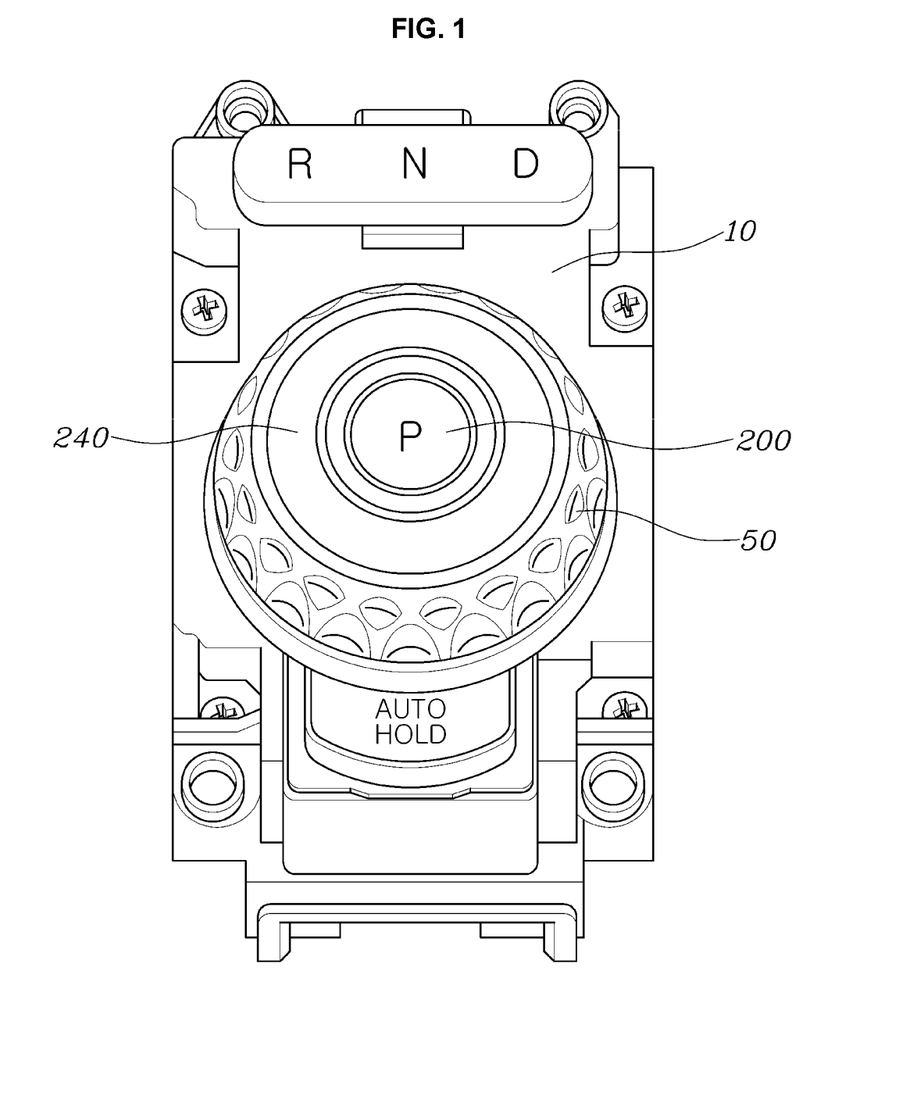
FIG. 1 is a view of an electronic shift control apparatus according to the present disclosure.
Figure 2:
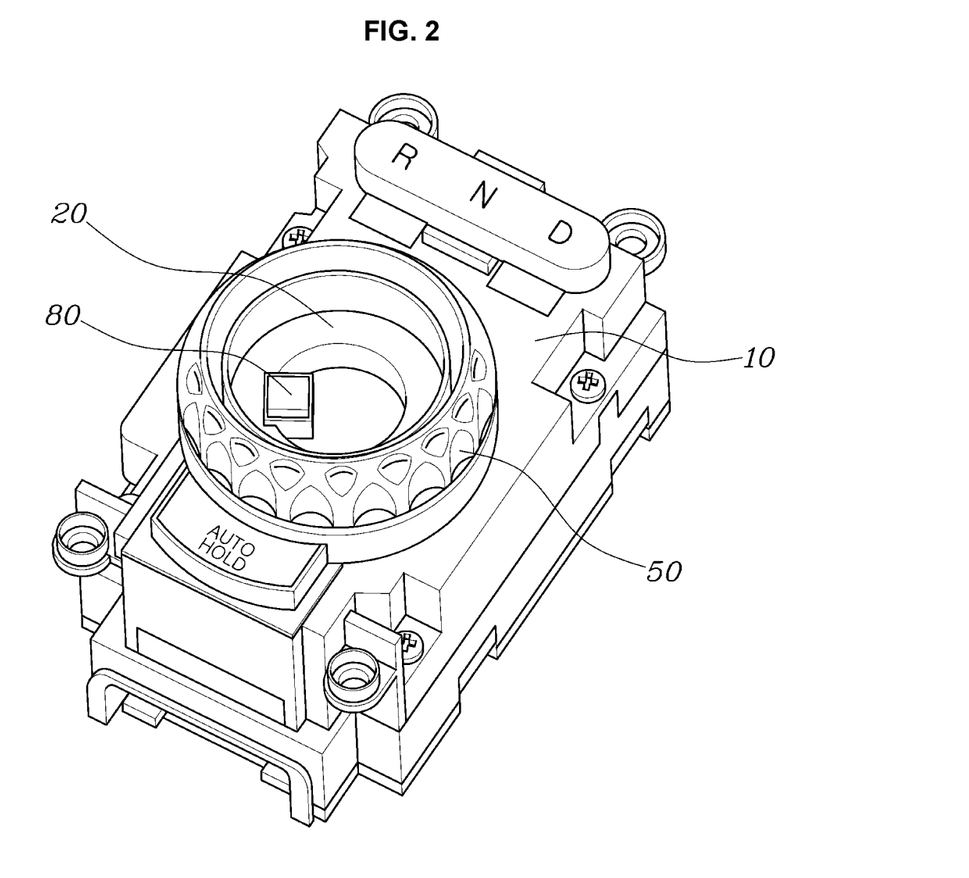
FIG. 2 is a view showing the electronic shift control apparatus with a P-range button and a top of a shift dial removed.

The main housing 10 may be fixed to a body of the vehicle such as a console, a center fascia, or the like close to a driver seat in the vehicle, but the installation position may be changed, if necessary.

Figure 9:
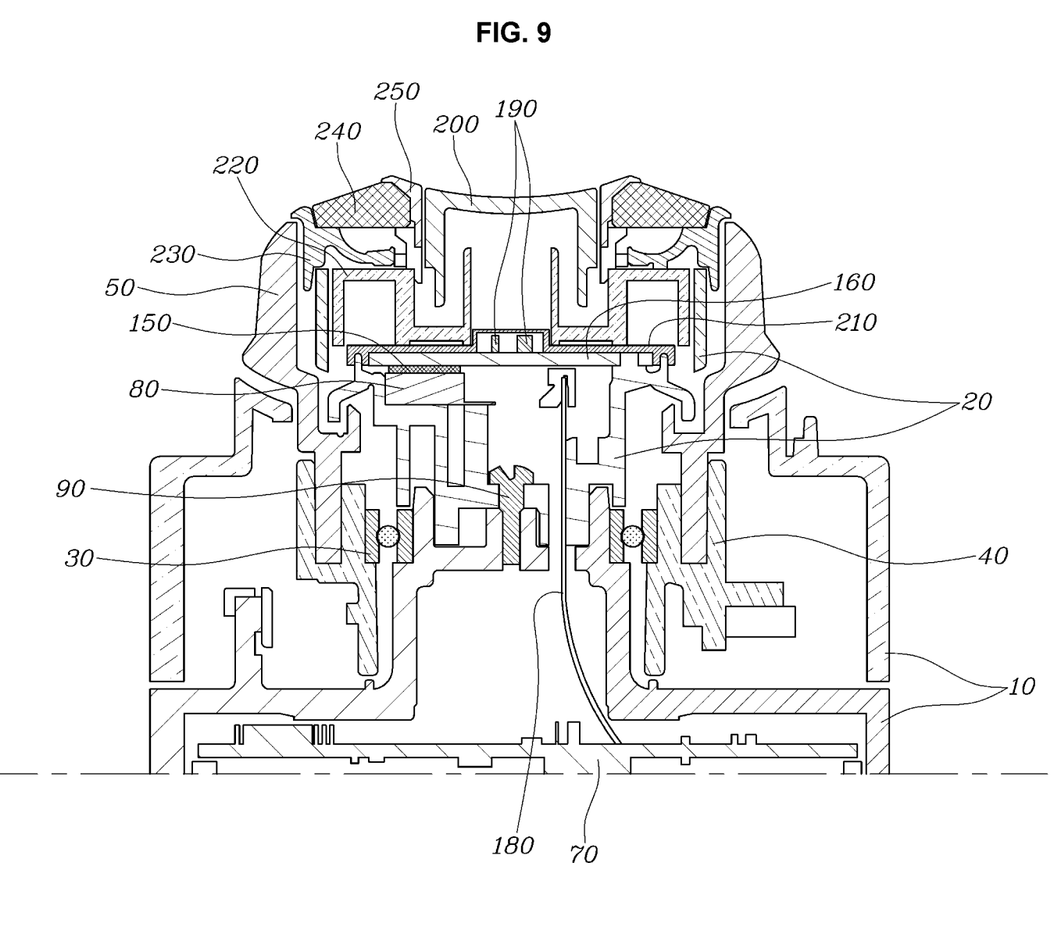
FIG. 9 is a cross-sectional view of the electronic shift control apparatus according to the present disclosure.

The fixing bracket 20 may be fixed to the main housing 10 by a coupling member 90 such as a bolt or screw.

A bearing 30 is disposed between the main housing 10 and the rotator 40, so the rotator 40 can be rotated with respect to the main housing 10 by the bearing 30.

As another example, a bearing 30 is disposed between the rotator 40 and the fixing bracket 20 fixed to the main housing 10 through the coupling member 90, so the rotator 40 can be rotated with respect to the main housing 10 and the fixing bracket 20 by the bearing 30.

The bearing 30 includes an inner race, an outer race, and several balls disposed between the inner race and the outer race, the inner race is coupled to the main housing 10 or the fixing bracket 20, and the outer race is coupled to the rotator 40. Accordingly, the rotator 40 can be rotated clockwise or counterclockwise with respect to the main housing 10 and the fixing bracket 20 by the bearing 30.

Figure 3:
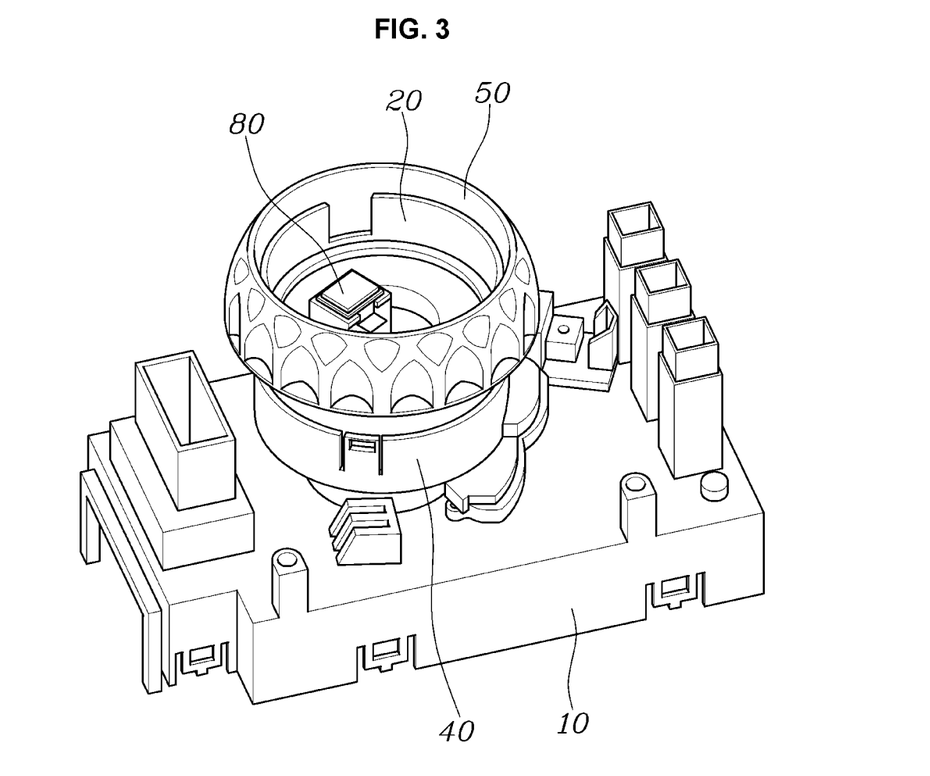
FIG. 3 is a view illustrating the combination of a rotator and a bottom of the shift dial shown in FIG. 2.

The rotator 40 is integrally coupled to a bottom of the shift dial 50 and extends downward from the shift dial 50. When the shift dial 50 is operated by a driver, the shift dial 20 and the rotor 40 are rotated together clockwise or counterclockwise with respect to the main housing 10 and the fixing bracket 20.

Figure 4:
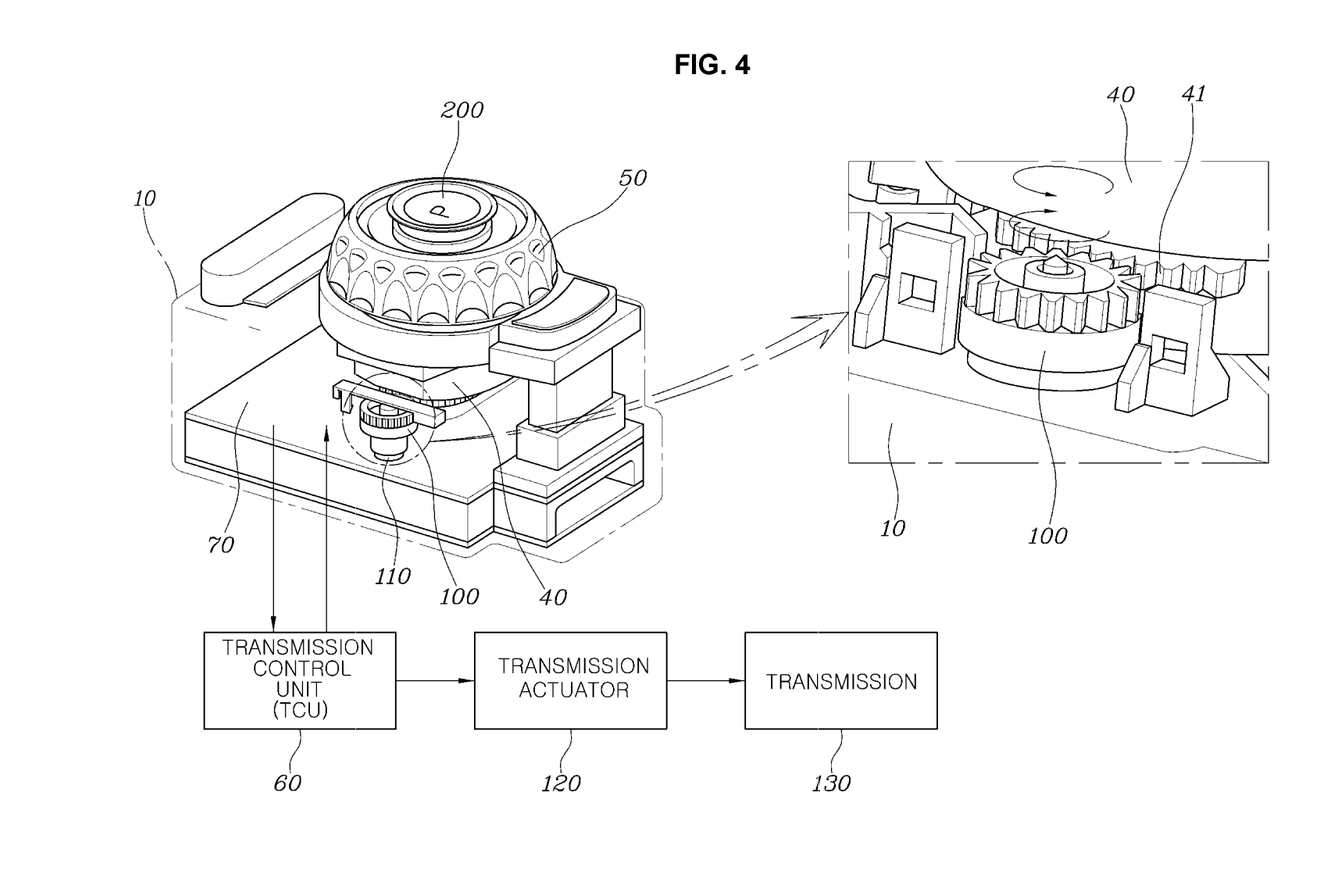
FIG. 4 is a view illustrating a sensing gear, a magnet, and a main PCB according to the present disclosure.

The main PCB 70 is disposed under the rotator 40, is fixed to the main housing 10, and is electrically connected to a power source (battery) of a vehicle to be able to be supplied with power.

The main PCB 70 has a function of outputting a shift range signal selected when the shift dial 50 is operated to the TCU 70 and a function of controlling the operation of a haptic motor 80. The frequency, intensity, and number of times of vibration that is generated by the haptic motor 80 can be controlled to be changed by the main PCB 70.

The shift range of a vehicle that is selected when the shift dial 50 is operated is one of an R-range, an N-range (Nd-range and Nr-range), or a D-range.

The rotator 40 has a groove protruding outward, the groove is in contact with a detent assembly having elasticity, and the detent assembly is fixed to the main housing 10.

When the shift dial 50 is rotated, an operation feeling is generated by contact between the groove and the detent assembly. When a driver releases the rotated shift dial 50, the rotated shift dial 50 is returned to the initial position by the elasticity of the detent assembly.

That is, the Nd-range is selected when the shift dial 50 is rotated one step clockwise from a Null-range and the D-range is selected when the shift dial 50 is further rotated one step clockwise from the Nd-range. Further, the Nr-range is selected when the shift dial 50 is rotated one step counterclockwise from the Null-range and the R-range is selected when the shift dial 50 is further rotated one step counterclockwise from the Nr-range. When the operation force is removed after the shift dial 50 is operated, the shift dial 50 is returned to the Null-range from the D-range or the R-range by the elasticity of the detent assembly being in contact with the groove.

The electronic shift control apparatus according to the present disclosure further includes a sensing gear 100 rotatably coupled to the main housing 10 and engaged with the rotator 40 in an external gear type, and a magnet 110 combined with the sensing gear 100.

A gear part 41 having a predetermined length is circumferentially formed on the outer surface of the rotator 40. The gear part 41 of the rotator 40 is engaged with the sensing gear 100 in an external gear type. The magnet 110 is fixed to the sensing gear 100 to face the main PCB 70

When the shift dial 50 is rotated by a driver, the rotator 40 and the sensing gear 100 are rotated. As the sensing gear 100 is rotated, the main PCB 70 recognizes a shift range signal of any one of the R-range, the N-range (Nd-range and Nr-range), or the D-range based on a change of magnetic flux due to a position change of the magnet 110 and outputs the shift range signal to the TCU 60.

A Shift-By-Wire (SBW) system that is an electronic shift system has no mechanical connection structure such as a cable between the shift dial 50 and the transmission of the vehicle. When the shift dial 50 is operated by a driver and any one shift range of the R-range, the N-range (Nd-range and Nr-range), and the D-range is selected, the main PCB 70 transmits the selected shift signal to the TCU 60, a transmission actuator 120 is operated in response to a signal given from the TCU 60, and hydraulic pressure is applied or cut to the hydraulic circuit of each of the shift ranges of a transmission 130 by operation of the transmission actuator 120, whereby shifting is electronically performed by the transmission 130.

Figure 6:
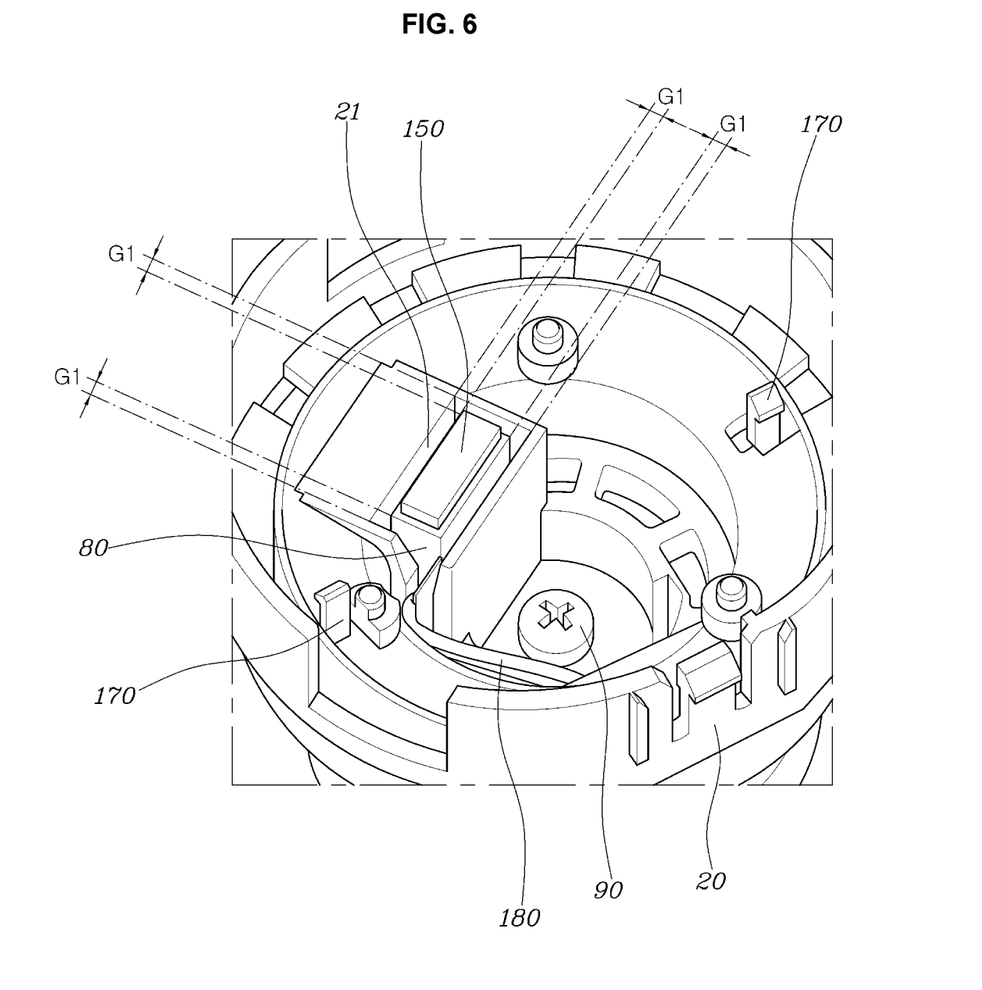
FIG. 6 is a view illustrating the state in which a haptic motor is installed in an installation grove of the fixed bracket according to the present disclosure.

An installation groove 21 having a predetermined size is formed at the fixing bracket 20 and the haptic motor 80 is inserted and installed in the installation groove 21 of the fixing bracket 20.

Figure 8:
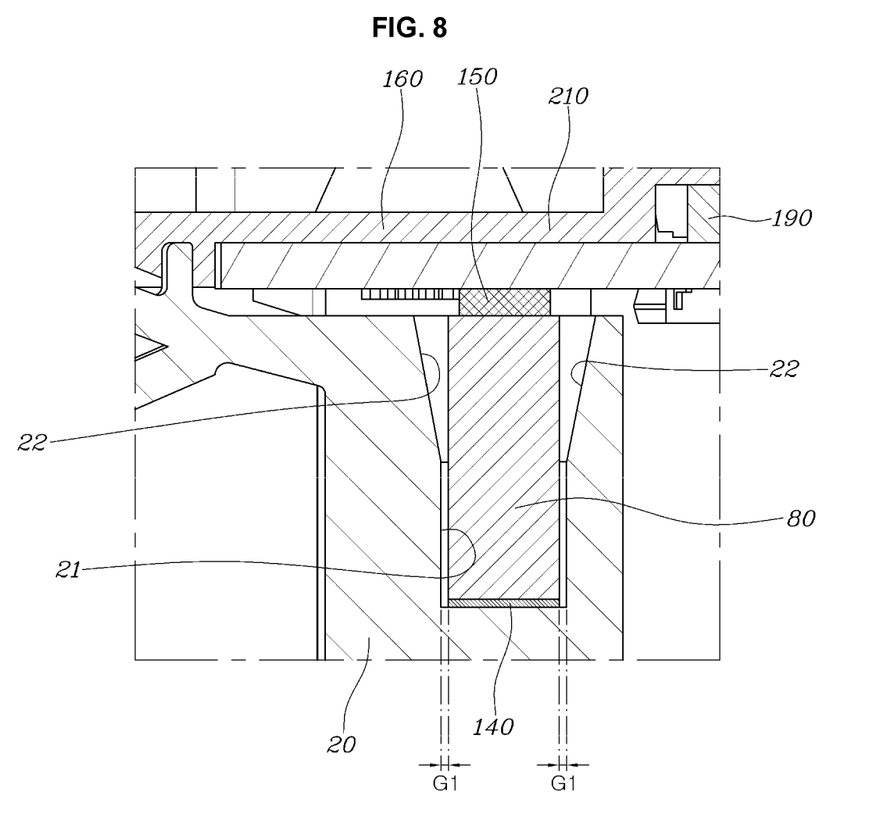
FIG. 8 is a cross-sectional view of the portion where the haptic motor is installed in FIG. 7.

An adhesive member 140 such as a double-sided tape is coupled to a bottom of the haptic motor 80 to fix the haptic motor 80, so the haptic motor 80 is fixed to a bottom of the installation groove 21 by the adhesive member 140.

When the haptic motor 80 is inserted and installed in the installation groove 21 of the fixing bracket 20, the front, rear, left, and right surfaces of the haptic motor 80 is spaced apart from the installation grove 21 such that an air gap G1 is formed between the haptic motor 80 and the installation groove 21.

The air gap G1, which is a space existing between the haptic motor 80 and the installation groove 21, blocks or minimize vibration and noise that is generated by the haptic motor 80 and unnecessarily transmitted to surrounding parts.

The installation groove 21 formed at the fixing bracket 20 is open upward and a mouth of the installation groove 21 (a section from a middle portion to a top in an up-down direction of the installation groove) is formed such that the cross-sectional area thereof gradually increases upward so that the haptic motor 80 can be easily inserted into the installation groove 21. To this end, the mouth of the installation groove 21 may have an inclined surface 22.

Figure 7:
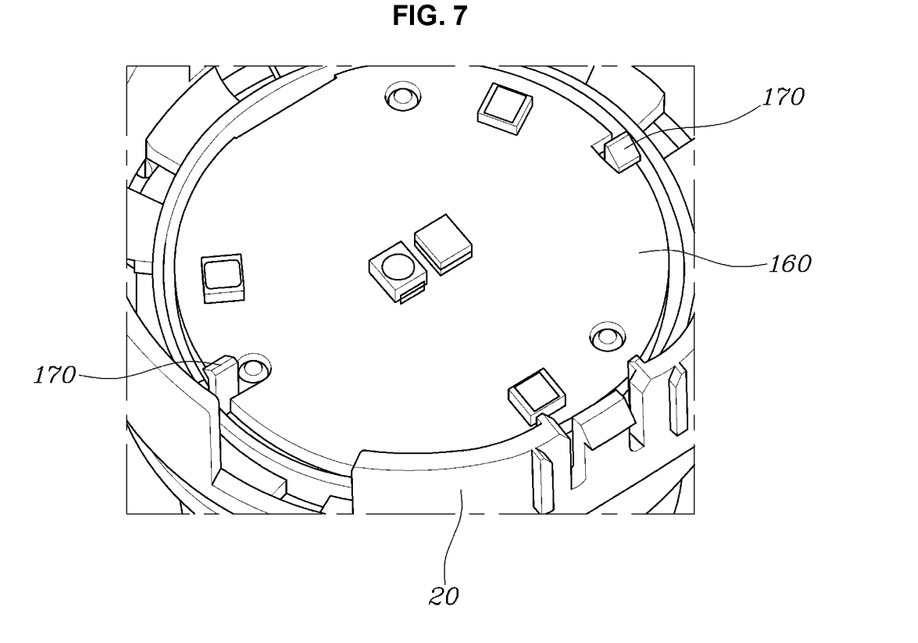
FIG. 7 is a view showing the state in which a support PCB is combined to cover the haptic motor in FIG. 6.

A pad member 150 made of rubber is fixed to a top of the haptic motor 80 inserted and installed in the installation groove 21, and a support PCB 160 is fixed over the pad member 150.

The pad member 150 is coupled to the top of the haptic motor 80 by an adhesive member, and when the haptic motor 80 is inserted and installed in the installation groove 21, the upper portion of the pad member 150 is partially exposed out of the installation groove 21.

Several hook protrusions 170 protruding upward further than the fixing bracket 20 are formed around the installation groove 21 and the support PCB 160 is held and fixed by the hook protrusions 170. When the support PCB 160 is held and fixed by the hook protrusions 170, a bottom of the support PCB 160 presses a top of the pad member 150.

When the support PCB 160 is held and fixed by the hook protrusions 170, rotation of the support PCB 160 is prevented by the hook protrusion 170. Further, since the support PCB 160 presses the top of the pad member 150, the position of the haptic motor 80 can be fixed in the up-down direction.

Vibration and noise generated when the haptic motor 80 is operated is mostly absorbed by the pad member 150, so they are not or minimally transmitted to the support PCB 160. Accordingly, damage to the support PCB 160 due to the vibration of the haptic motor 80 can be prevented.

The support PCB 160 is disposed over the main PCB 70, and the main PCB 70 and the support PCB 160 are connected to each other through a wiring 180 to be supplied with power and to transmit/receive signals.

An LED 190 that takes charge of lighting is electrically connected to the support PCB 160, so the LED is controlled to be turned on and off by the support PCB 160.

As another example of the present disclosure, the pad member 150 may be coupled to both the top and the bottom of the haptic motor 80, whereby it is possible to further improve the effect of reducing vibration and noise generated by the haptic motor 80.

The electronic shift control apparatus according to the present disclosure further includes a P-range button 20 that is disposed to be movable up and down at the center of the shift dial 50 and is configured to be pressed by a driver. When contact with the P-range button 200 occurs, the support PCB 160 generates and transmits a P-range signal to the main PCB 70 through the wiring 180.

When a driver presses the P-range button 200, a switch rubber 210 disposed under the P-range button 200 is elastically compressed and comes in contact with the support PCB 160 and the support PCB 160 recognizes and transmits a P-range signal, which is generated when the P-range button 200 is operated, to the main PCB 70 through the wiring 180. When the driver releases the P-range button 200, the P-range button 200 moved downward is returned upward to the initial position by the restoring force of the switch rubber 210.

The main PCB 70 operates the haptic motor 80 only when a shift signal selected when the shift dial 50 or the P-range button 200 is operated and the actual shift signal of the transmission 130 that is fed back through the TCU 60 coincide with each other.

That is, when a shift signal selected when the shift dial 50 or the P-range button 200 is operated is transmitted to the main PCB 70, the main PCB 70 transmits the selected shift signal to the TCU 60, the transmission actuator 110 is controlled to operate by the TCU 60 and actual shifting is performed in the transmission 130, the actual shift signal of the transmission 130 is fed back to the main PCB 70 through the TCU 60, and the main PCB 70 operates the haptic motor 80 only when the shift signal selected when the shift dial 50 or the P-range button 200 is operated and the actual shift signal of the transmission 130 that is fed back through the TCU 60 coincide with each other.

When the shift dial 50 is operated and the R-range is selected, the haptic motor 80 is controlled to operate and generate a haptic signal by the main PCB 70. The haptic signal is transmitted to the shift dial 50 through the fixing bracket 20, the bearing 30, and the rotator 40 with a minimum loss, and is finally transmitted to the driver's hand operating the shift dial 50. Accordingly, the driver receives a tactual signal due to vibration of the haptic motor 80, whereby the degree of recognition of the driver operating the shift dial can be maximized.

Since the driver receives a haptic signal through the shift dial 50, it is possible to prevent an accident due to wrong selection of the shift ranges, whereby it is possible to further improve safety when shifting.

Figure 5:
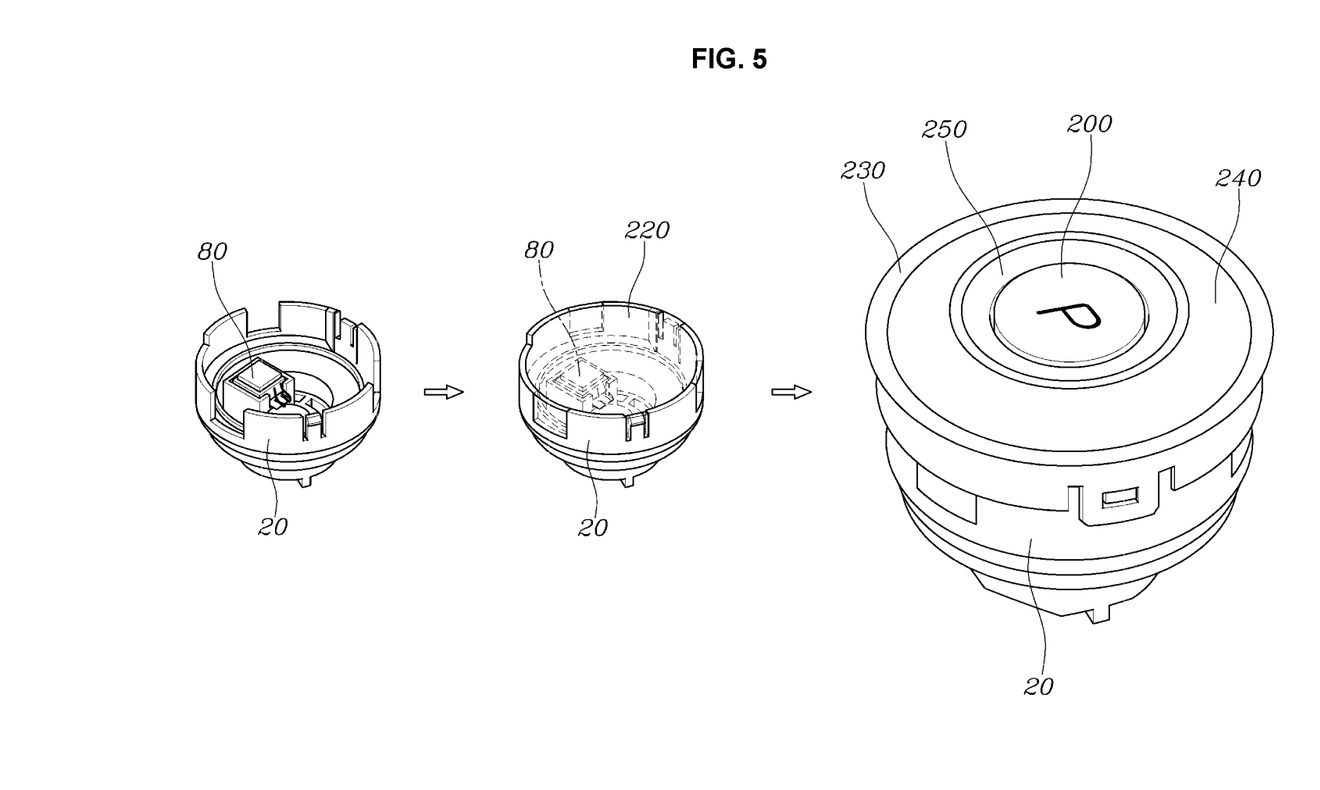
FIG. 5 is a view illustrating the configuration for connecting a fixing bracket and P-range button according the present disclosure.

When the P-range button 200 is operated and the P-range is selected, the haptic motor 80 may be controlled to operate and generate a haptic signal by the main PCB 70. The haptic signal generated in this case is transmitted to the P-range button 200 through the fixing bracket 20, a dial guide 220, a dial bezel 230, a dial glass 240, and a dial liner 250, and is finally transmitted to the driver's hand operating the P-range button 200. Accordingly, the driver can receive a tactual signal due to vibration of the haptic motor 80.

The support PCB 160 is coupled to the fixing bracket 20, the dial guide 220 is coupled to the fixing bracket 20 to cover the support PCB 160, the dial bezel 230, the dial glass 240, and the dial liner 250 are combined to cover the dial guide 220, and the P-range button 200 is disposed at the center of the dial liner 250.

Light generated by the LED 190 is exposed to the outside through the dial glass 240, whereby it is possible to further esthetically improve the elegant image of the electronic shift control apparatus.

The configuration that the haptic motor 80 operates and generates a haptic signal when a driver operates the P-range button 200 is a selective matter, and the haptic motor 80 may not operate and may not generate a haptic signal when the P-range button 200 is operated.

The haptic motor 80 according to the present disclosure can be applied to and used for other shift control apparatuses of a lever type that enable shifting by operating a shift lever, a button type that enable shifting by operating a shift button, a column type in which a shift lever is disposed on a steering column, and a toggle type enabling shifting by operating a toggle switch.

As described above, the electronic shift control apparatus according to the present disclosure includes the shift dial 50 that is operated by a driver to select an R-range, an N-range (Nd-range and Nr-range), and a D-range, the P-range button 200 that is operated to select a P-range, and the haptic motor 80 that generates a haptic signal. Accordingly, when a driver shifts into a specific shift range (R-range or P-range) of a vehicle by operating the shift dial 50 or the P-range button, the haptic motor 80 is operated and a haptic signal (tactual signal) can be transmitted to the driver, whereby it is possible to prevent mis-operation by the driver when shifting. Therefore, there is an advantage that safety can be improved.

Further, since the air gap G1 is formed around the haptic motor 80 that generates a haptic signal in the present disclosure, unnecessary transmission of vibration and noise generated by the haptic motor 80 to other parts can be minimized, whereby it is possible to improve durability of the parts.

Further, since the fixing bracket 20 and the haptic motor 80 can be spaced apart from each other by the air gap G1 in the present disclosure, it is possible to prevent damage to the haptic motor 80 due to the fixing bracket 20 when the haptic motor 80 is operated.

If there is no air gap between the fixing bracket 20 and the haptic motor 80, when the haptic motor 80 is operated, the fixing bracket 20 may be severely vibrated, and any vibration of the fixing bracket 20 is transmitted back to the haptic motor 80, so the haptic motor 80 may be damaged. Therefore, according to the present disclosure, damage to the haptic motor 80 due to the fixing bracket 20 when the haptic motor 80 is operated can be prevented by the air gap G1 between the fixing bracket 20 and the haptic motor 80.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. An electronic shift control apparatus, comprising:
   a fixing bracket fixed to a main housing;
   a rotator installed to be rotatable with respect the main housing;
   a shift dial coupled to the rotator, the shift dial configured to rotate with the rotator by a driver so as to select any one of shift ranges of a vehicle when rotating;
   a main printed circuit board (PCB) fixed to the main housing and outputting a shift range signal selected by the shift dial to a transmission control unit (TCU);
   a haptic motor fixed to the fixing bracket, the haptic motor being controlled to operate by the main PCB so as to generate a haptic signal when operating;
   a pad member coupled to a top of the haptic motor and absorbing vibration and noise that are generated when the haptic motor is operated; and
   a support PCB coupled to hook protrusions protruding upward further than the fixing bracket, fixing the position of the haptic motor in an up-down direction by pressing a top of the pad member, and connected to main PCB through a wiring.

2. The electronic shift control apparatus of claim 1, wherein the shift range of the vehicle that is selected when the shift range is operated is any one of an R-range, an N-range, or a D-range.

3. The electronic shift control apparatus of claim 1, further comprising:
   a sensing gear rotatably coupled to the main housing and engaged with the rotator is an external gear; and
   a magnet combined with the sensing gear,
   wherein the main PCB outputs a shift range signal of any one of an R-range, an N-range, or a D-range based on a change of magnetic flux due to a position change of the magnet when the shift dial is rotated.

4. The electronic shift control apparatus of claim 1, wherein the haptic motor is inserted and installed in an installation groove formed at the fixing bracket,
   a bottom of the haptic motor is coupled to a bottom of the installation groove through an adhesive member, and
   front, rear, left, and right surfaces of the haptic motor are spaced apart from the installation groove such that an air gap exists between the haptic motor and the installation groove.

5. The electronic shift control apparatus of claim 4, wherein the installation groove is open upward, and
   a mouth of the installation groove has an inclined surface such that a cross-sectional area thereof gradually increases upward.

6. The electronic shift control apparatus of claim 1, further two pad members, with one pad member coupled to a top of the haptic motor and the other pad member coupled to a bottom of the haptic motor, wherein the two pad members absorb vibration and noise that are generated when the haptic motor is operated.

7. The electronic shift control apparatus of claim 1, further comprising:
a P-range button disposed to be movable up and down at a center of the shift dial and configured to be pressed by the driver,
wherein the support PCB generates and transmits a P-range signal to the main PCB when contact with the P-range button occurs.

8. The electronic shift control apparatus of claim 7, wherein vibration and noise that are generated when the haptic motor is operated are absorbed by the pad member and are not transmitted to the support PCB.

9. The electronic shift control apparatus of claim 7, wherein the main PCB operates the haptic motor only when a shift signal selected when the shift dial or the P-range button is operated and an actual shift signal of a transmission that is fed back through the TCU coincide with each other.

10. The electronic shift control apparatus of claim 7, wherein the haptic motor is controlled to operate and generate a haptic signal by the main PCB when the P-range button is operated and a P-range is selected.

11. The electronic shift control apparatus of claim 7, further comprising a dial guide, a dial bezel, a dial glass, and a dial liner that are combined to connect the fixing bracket and the P-range button to each other,
wherein a haptic signal generated by the haptic motor is transmitted to a driver's hand operating the P-range button through the fixing bracket, the dial guide, the dial bezel, the dial glass, the dial liner, and the P-range button.

12. The electronic shift control apparatus of claim 1, wherein the haptic motor is controlled to operate and generate the haptic signal by the main PCB when the shift dial is operated and an R-range is selected.

13. The electronic shift control apparatus of claim 1, wherein a haptic signal generated by the haptic motor is transmitted to a driver's hand operating the shift dial through the main housing, the fixing bracket, the rotator, and the shift dial.

14. The electronic shift control apparatus of claim 1, wherein the rotator is configured to be rotated by a bearing disposed between the main housing and the rotator or between the fixing bracket and the rotator.

* * * * *